United States Patent [19]

Berthold et al.

[11] Patent Number: 4,976,157

[45] Date of Patent: Dec. 11, 1990

[54] FIBER OPTIC FLOW SENSOR

[75] Inventors: John W. Berthold; Lawrence B. Thompson, both of Salem, Ohio

[73] Assignee: The Babcock & Wilcox Company, New Orleans, La.

[21] Appl. No.: 433,493

[22] Filed: Nov. 8, 1989

[51] Int. Cl.⁵ .............................................. G01F 1/32
[52] U.S. Cl. ................................................. 73/861.24
[58] Field of Search ................ 73/861.23, 861.24, 653, 73/655

[56] References Cited

U.S. PATENT DOCUMENTS

| | | | |
|---|---|---|---|
| 3,979,954 | 9/1976 | Ide et al. | 73/861.24 |
| 4,206,642 | 6/1980 | Bearcroft | 73/194 |
| 4,501,157 | 2/1985 | Perkinson | 73/861.24 |
| 4,594,504 | 6/1986 | Coursolle | 73/861.24 X |
| 4,656,353 | 4/1987 | Thompson | 73/861.24 X |
| 4,674,900 | 6/1987 | Erzsebet et al. | 73/517 R |
| 4,831,883 | 5/1989 | Kamenster | 73/861.22 |

FOREIGN PATENT DOCUMENTS

| | | | |
|---|---|---|---|
| 49-34343 | 3/1974 | Japan . | |
| 0002505 | 1/1981 | Japan | 73/861.24 |
| 2111680 | 7/1983 | United Kingdom | 73/861.24 |

*Primary Examiner*—Herbert Goldstein
*Attorney, Agent, or Firm*—Vytas R. Matas; Robert J. Edwards; Daniel S. Kalka

[57] ABSTRACT

A fiber optic flow sensor situated transversely in a conduit wherein two fiber optic cables are enclosed with a holding mechanism or tube. The fiber optic cables are axially aligned but separated by a gap. Fluid flow in the conduit produces a deflection in the tube and attenuation of light transmitted from one fiber to the other which is proportional to the flow rate.

11 Claims, 3 Drawing Sheets

FIBER OPTIC FLOW SENSOR

FIELD OF THE INVENTION

This invention relates to the measurement of fluid flow and has particular application to sensing the flow of fluids that may be caustic, flammable, or at extreme pressures or temperatures utilizing fiber optics as a sensor.

DESCRIPTION OF THE PRIOR ART

Basic acceptable methods of flow measure in the field of fluid mechanics utilize orifices, pitot tubes, flow nozzles or venturi tubes as primary elements. Pressure drop or pressure differential across these elements can be converted into flow rate. More recently vortex shedding flowmeters have been developed which use the measurement of the frequency of vortex shedding as an indication of flow rate. Optical fibers have had some application in vortex shedding flowmeters. For example, U.S. Pat. No. 4,206,642 issued to K. E. Bearcroft on June 10, 1980, discloses means to vary the optical coupling between two fibers responsive to the frequency of vortex shedding. U.S. Pat. No. 4,472,022 issued to K. E. Bearcroft, et al on Sept. 18, 1984, is somewhat similar. This invention utilizes a signal fiber, one end of which transmits light and reflects a modulated light signal back to the same transmitting fiber, modulation generally being effected by diaphragms responsive to vortex shedding.

Disadvantages of the prior art devices include direct exposure to hostile environments due to characteristics of the fluid being measured, moving parts subject to maintenance, pluggage and wear, and excessive pressure losses.

SUMMARY OF THE INVENTION

The present invention comprises a fluid flow rate sensor utilizing fiber optics as sensing elements. Two fibers, a transmitter and a receiver, are enclosed in a holding mechanism or tube which is immersed in a flowing fluid. The fibers are separated by a gap and light attenuation is effected by flexure of the holding mechanism. The light attenuation is measured and is proportional to the force exerted on the tube and as a result to the velocity of the fluid flow in the conduit.

Accordingly, one object of the present invention is directed to an apparatus for measuring flow rates of fluid.

Another object of the present invention is directed to a fluid flow rate sensor for measuring flow rates of fluids that may be caustic, toxic, flammable, or at extreme temperatures or pressures utilizing fiber optics as a sensor.

Advantageously, fiber optics provide no electrical or electromagnetic perturbation of operating environment, feasibility of remote operation, low power requirements, and high sensitivity.

The various features of novelty which characterize the invention are pointed out with particularity in the claims annexed to and forming a part of this disclosure. For a better understanding of the invention, and the operating advantages attained by its use, reference is made to the accompanying drawings and descriptive matter in which a preferred embodiment of the invention is illustrated.

DESCRIPTION OF THE PREFERRED EMBODIMENTS

Figure 1:
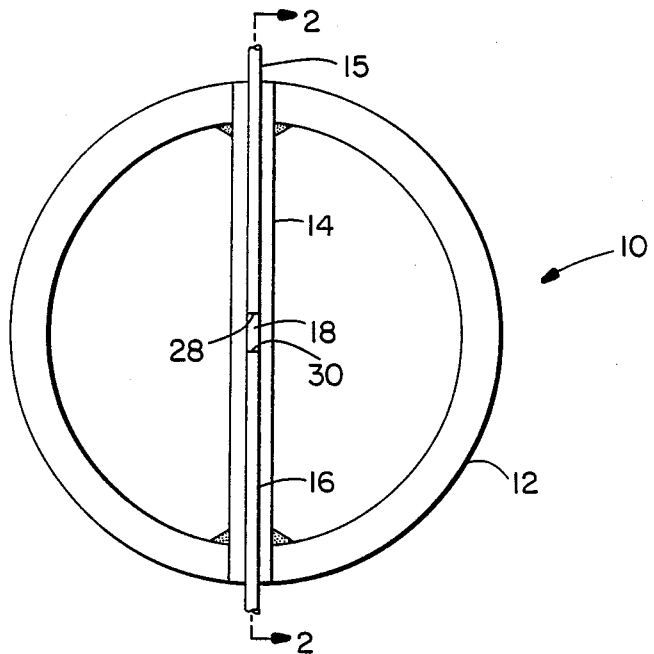
FIG. 1 is a sectional end view of a fiber optic flow sensor embodying principles of the invention.
Figure 2:
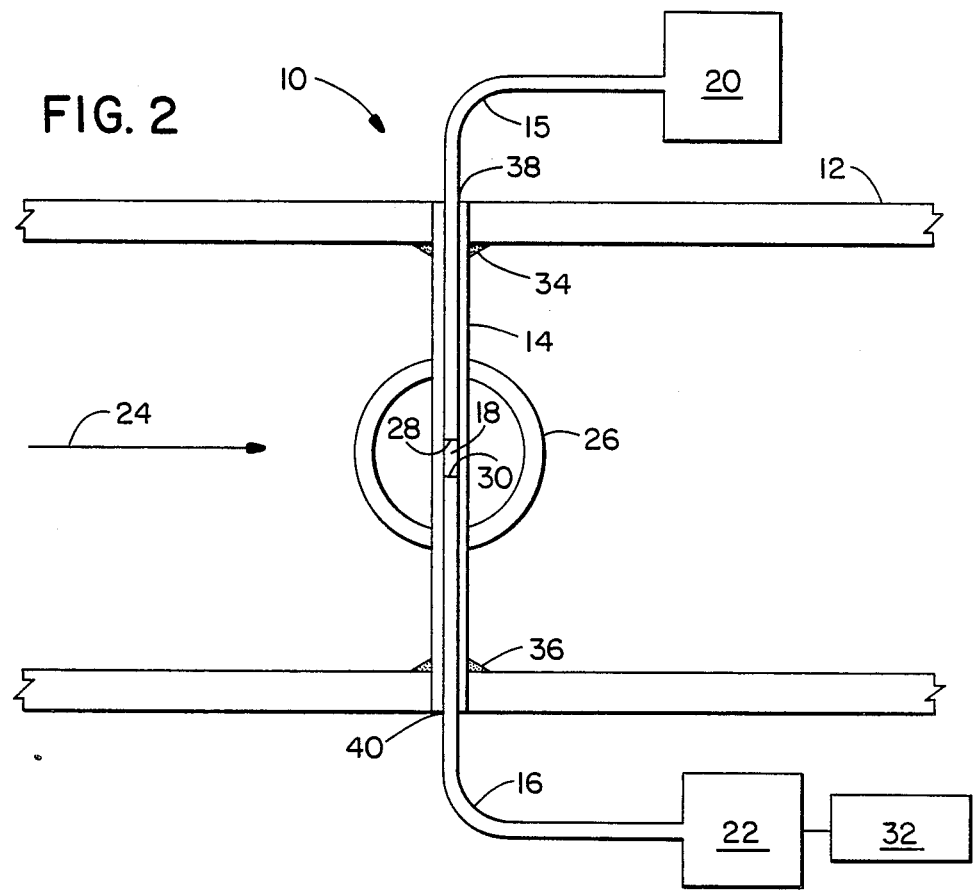
FIG. 2 is a partly schematic sectional side view taken along the line 2—2 of FIG. 1 and showing an optional flow restriction.

Referring first to FIG. 2, a fiber optic sensor apparatus 10 is shown for measurement of fluid flow in the direction indicated by arrow 24 in a conduit or pipe 12. Fiber holding mechanism or tube 14 is fixed rigidly at ends 34, 36 and supported in conduit 12. The tube 14 is flexible and acts as a linearly elastic beam. It is made from an inert material impervious to the effects of any hostile environment of use. Suitable materials include stainless steel. Alternatively, tube 14 may have an impervious coating material like Teflon, a registered trademark of E. I. DuPont De Nemours & Co., for protection from the hostile environment. A first fiber optic cable 15 is connected at one end to a light transmitter 20. Light transmitter 20 is either a light emitting diode, an incandescent lamp, or some other light source. The other end of optical fiber 15 extends into tube 14 and terminates therein. A second optical fiber 16 is connected at one end to a light receiver or photodetector 22. The other end of optical fiber 16 also extends into tube 14 diametrically opposite optical fiber 15 and terminates therein. Both optical fibers 15, 16 are held securely at the junctions 38, 40, respectively, and inside tube 14.

Optical fibers 15, 16 are situated within tube 14 so as to provide a gap 18 between the end faces 28, 30 of cables 15 and 16, respectively. Gap 18 typically 25 $\mu$m to 150 $\mu$m is an air gap, however, it is envisionable that gap 18 may be filled with any suitable transparent gas.

Light transmitter 20 and photodetector 22 are a conventional light source and detector system. A microprocessor or computer 32 receives signals from the light detector 22 to calculate and display flow velocity of the fluid in conduit 12.

Fibers 15 and 16 have a common optical axis, i.e., they are axially aligned with one another but are separated by the small gap 18.

In operation, at a no-flow condition in the conduit 12, the fibers 15, 16 are axially aligned and the maximum radiation or light intensity is received by the light detector 22 via optical fiber 16 from the light source 20 which provides illumination to the transmitting optical fiber 15. Under conditions of flow in the conduit 12, a force is exerted on the holding mechanism or tube 14 causing it to deflect or bend, similar to a beam under uniform loading supported at each end.

The deflection and angle of the bend with respect to the no-flow position are directly proportional to the drag force exerted on the tube 14 by the movement of the fluid through conduit 12. The stiffness of tube 14 influences the amount of bend caused by a particular fluid flow rate.

Figure 3:
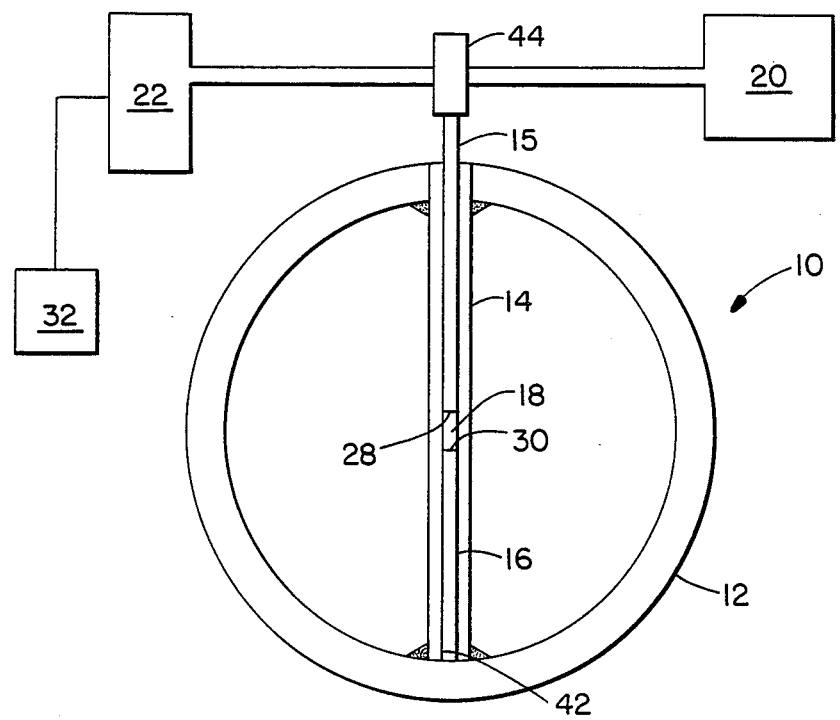
FIG. 3 is a sectional end view of an alternate embodiment of the present invention.

The deflection or bending causes a decoupling effect or attenuation of the transmitted light to the receiving optical fiber 16 due to the separation of the fibers 15, 16 at the gap 18 and the angularity between the faces 28, 30 of the fibers 15, 16. The light attenuation is proportional to the force exerted on the holding mechanism 14 and to the square of the velocity of flow in the conduit 12. An alternative sensor configuration to the double-ended one disclosed is a single ended approach as best illustrated in FIG. 3. In this approach, light would enter and leave the holding mechanism through the same fiber. After traversing the gap 18, light would enter a shortened cable 16 with a reflector 42 on the end to return the light along the same path through which it came. At the light source 20 end a 3dB power divider 44 is located to pick up the reflected signal and route it to the photodetector 22.

Several factors, including the length of the gap 18, the flexibility and material of the holding mechanism 14, affect the sensitivity of the device 10.

Because the sensor measures the deflection due to applied force, the sensitivity of the sensor can be optimized by adjusting the stiffness of the holding mechanism 14. Decreasing the stiffness of tube 14 increases the sensitivity.

Figure 4:
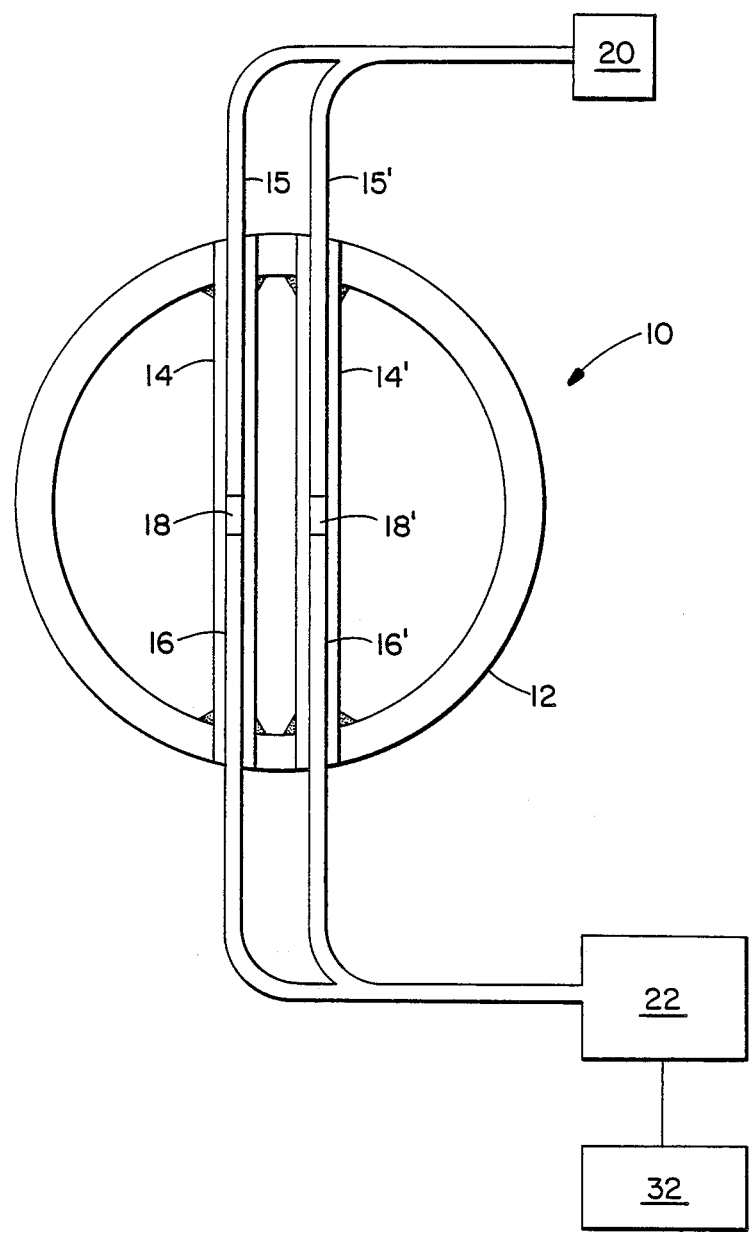
FIG. 4 is a sectional end view of still another embodiment of the present invention.

The tube may be formed into a bellows shape for maximum flexibility, or may be of typical cylindrical geometry. By suitable adjustment of the wall thickness of the cylindrical tube, the flexibility and thus sensitivity to low flow rates may be adjusted accordingly. FIG. 4 depicts an alternative embodiment which includes two parallel tubes, each with pairs of sensor fibers, to cover a large dynamic flow range. One tube 14 has a thin wall and is sensitive to low flow rates. At some intermediate flow rate, the two fibers in this tube become totally misaligned and inoperative and the light transmission approaches zero. The second tube 14' has a thicker wall than the first tube 14 such that at a low flow rate, the displacement of the optical fibers 15', 16' is imperceptible, but increases and is detectable at intermediate flow rates and up to maximum flow. At these flow rates the first tube 14 with sensor fibers 15, 16 is inoperative.

Another factor affecting sensitivity is the projected cross-sectional area of the obstruction to the fluid flow path provided by the sensor holding mechanism 14. An increase in this cross-sectional area, such as installing an additional obstruction 26, as best illustrated in FIG. 2, around the tube 14 increases the sensitivity. A given rate of fluid flow causes an increased force on the holding mechanism 14 and consequently a greater deflection. This increased force results from both the increased projected area of the flow obstruction and the increase in local velocity due to the decreased net flow cross-section. The obstruction 26 is composed of similar material as the tube 14 and, although shown as being spherical, may be of any shape which increases the area of obstruction to the flow. The shape of the obstruction as well as its cross-section affects the flow forces on the sensor holding mechanism 14; this shape can be selected to optimize the sensitivity over the desired flow range.

A fiber optic flow sensor constructed in accordance with the present invention employed a pair of 200 μm outer diameter (O.D.) optical fibers inserted into a thin walled stainless steel tube 14 with a 230 μm inner diameter (I.D.) and 368 μm OD. The optical fibers are standard buffer coated fibers well known in this art. Gap 18 was 25 μm.

The sensor performance was evaluated from a calculated flow rate knowing the conduit 12 dimensions and an independent measurement of ΔP along conduit 12. The sensor provided reproducibility and stability.

As disclosed, the sensor measures the static drag force component proportional to flow rate. Alternatively, the sensor's electronics processing may be configured to ignore the static signal and sense dynamic flow forces such as the periodic lift force.

While in accordance with provisions of the statutes, there is illustrated and described herein a specific embodiment of the invention, those skilled in the art will understand that changes may be made in the form of the invention covered by the claims, and certain features of the invention may sometimes be used to advantage without a corresponding use of the other features.

What is claimed is:

1. A fiber optic flow sensor, comprising:
   a conduit for conveying a fluid;
   a first optical fiber having one end extending into said conduit and terminating therein;
   a second optical fiber having one end extending into said conduit approximately opposite said first optical fiber and terminating therein, said first and second optical fibers being substantially in axial alignment within said conduit and substantially normal to said conduit with a gap separating the ends of said optical fibers;
   means for holding both optical fibers securely within said conduit, said holding means being rigidly attached to said conduit in an orientation substantially normal thereto, said holding means having flexibility to deflect with fluid flow in said conduit, said holding means including an obstruction for restricting flow area;
   a light source connected to the other end of said first optical fiber for transmitting light therethrough; and
   a light detector connected to the other end of said second optical fiber for measuring the transmitted light from said first optical fiber, whereby fluid flow in said conduit produces a deflection of said holding means which provides angularity between the ends of said optical fibers to attenuate the light transmitted in proportion to the fluid flow.

2. A fiber optic flow sensor as recited in claim 1, wherein said holding means is a tube.

3. A fiber optic flow sensor as recited in claim 1, further comprising means for calculating fluid flow connected to said light detector.

4. A method for measuring fluid flow in a conduit conveying a fluid, comprising the steps of:
   extending one end of a first optical fiber into the conduit;
   situating one end of a second optical fiber into the conduit approximately opposite the end of the first optical fiber so as to be substantially in axial alignment with both optical fibers being substantially normal to the conduit;
   providing a gap between the ends of the optical fibers with a holding mechanism securely retaining and surrounding the optical fibers;
   increasing a cross-sectional area of the holding mechanism for increasing sensitivity;
   transmitting light through the optical fibers with a light source;
   receiving the transmitted light with a light detector;
   deflecting the holding mechanism with fluid flow to attenuate the light in proportion to the fluid flow by providing angularity between the ends of the optical fibers; and measuring the received light intensity.

5. A method as recited in claim 4, further comprising the step of calculating the fluid flow from the measured light intensity.

6. A fiber optic flow sensor, comprising:

a conduit for conveying a fluid;

means for holding a pair of optical fibers situated within said conduit, said holding means being rigidly attached to said conduit in an orientation substantially normal to said conduit, said holding means having flexibility to deflect with fluid flow in said conduit, said holding means including an obstruction for restricting flow area;

a first optical fiber of said pair of optical fibers having one end extending into said conduit and terminating therein, said first optical fiber being held inside said conduit by said holding means;

a second optical fiber of said pair of optical fibers positioned securely within said conduit by said holding means substantially in axial alignment with said first optical fiber, said first and second optical fibers being situated to provide for a gap separating the ends of said first and second optical fibers, said second optical fiber having a reflector at the other end away from the gap;

means for transmitting light through said first optical fiber of said pair of optical fibers;

means for dividing the reflected light returned by said first and second optical fibers; and a light detector connected to said dividing means for measuring the reflected light, whereby fluid flow in said conduit produces a deflection of said holding means which provides angularity between the ends of said optical fibers to alternate the light reflected in proportion to the fluid flow.

7. A fiber optic flow sensor as recited in claim 6, wherein said holding means is a tube.

8. A fiber optic flow sensor as recited in claim 6, further comprising means for calculating fluid flow connected to said light detector.

9. A fiber optic flow sensor, comprising:

a conduit for conveying a fluid;

at least two means for holding a pair of optical fibers situated within said conduit and being substantially normal thereto, said holding means being capable of deflecting with fluid flow in said conduit, each of said holding means further having a predetermined flexibility for providing a range of sensitivity;

a first optical fiber of the pair of optical fibers having one end extending into said conduit and terminating therein;

a second optical fiber of the pair of optical fibers having one end extending into said conduit approximately opposite said first optical fiber and terminating therein, said first and second optical fibers being substantially in axial alignment within and substantially normal to said conduit, both of said optical fibers being positioned by said holding means to provide for a gap separating the ends;

means for transmitting light through said first optical fiber of the optical fiber pair; and means for detecting light connected to the other end of said second optical fiber of the optical fiber pair for measuring the transmitted light through said first optical fiber, whereby fluid flow in said conduit produces a deflection of said holding means which provides angularity between the ends of said first and second optical fibers to attenuate the light transmitted in proportion to the fluid flow.

10. A fiber optic flow sensor, as recited in claim 9, wherein said holding means is a tube.

11. A fiber optic flow sensor, as recited in claim 10, wherein the sensor includes two tubes being approximately parallel with respect to each other.

* * * * *